J. H. HINTON.
Lifting-Jacks.
No. 135,551.  Patented Feb. 4, 1873.
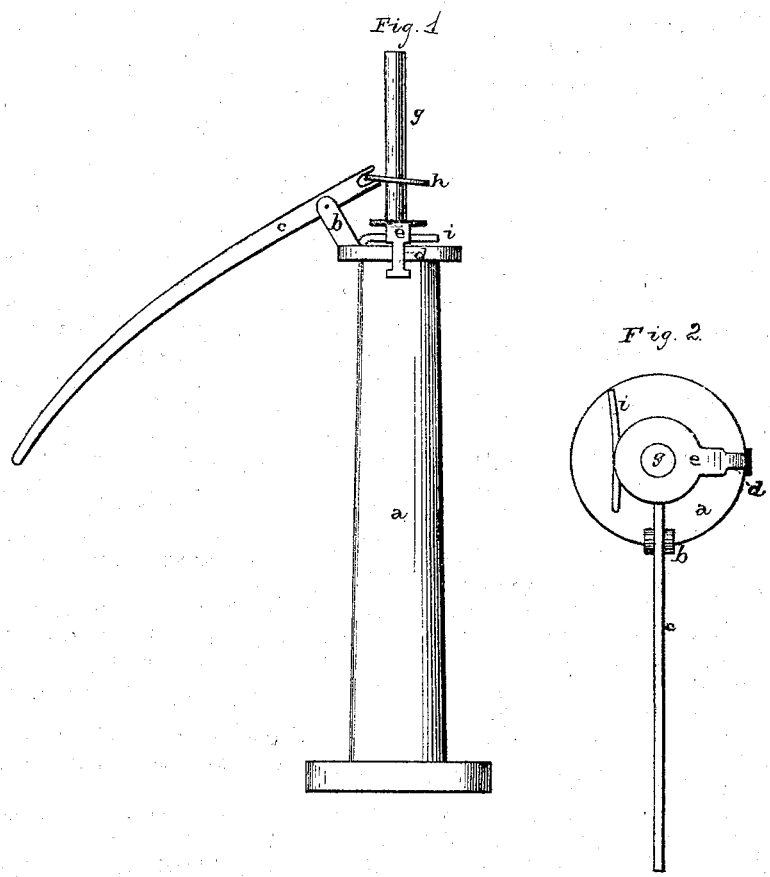
Witnesses.
F. A. Lehmann
W. H. Duhamel
Inventor.
Jacob H. Hinton.
Per H. S. Abbot
atty.
AM. PHOTO-LITHOGRAPHIC CO. N.Y. (OSBORNE'S PROCESS.)

UNITED STATES PATENT OFFICE.

JACOB H. HINTON, OF WAYNE COUNTY, OHIO.

IMPROVEMENT IN LIFTING-JACKS.

Specification forming part of Letters Patent No. 135,551, dated February 4, 1873.

*To all whom it may concern:*

Be it known that I, JACOB H. HINTON, of the county of Wayne and State of Ohio, have invented certain new and useful Improvements in Lifting-Jacks, of which the following is a specification:

The nature of my invention relates to the construction of a lifting-jack, in which the lifting-rod is operated by means of a friction-plate; and consists in the manner of attaching the dog to the standard, and a swinging lever for disengaging the dog from contact with the rod. It also consists in the general arrangement and combination of parts, which will be more fully set forth hereafter.

Figure 1 represents a side elevation of my jack. Fig. 2 is a plan view of the same, the lifting-plate being removed.

$a$ represents a cast-iron hollow standard, upon the top of which is a short standard, $b$, in which the lever $c$ is pivoted. In the side of the top of the standard is a slot, $d$, in which the friction-dog $e$ is held by the projections upon its lower end and by passing over the lifting-rod $g$, as shown in Fig. 2. By this arrangement the dog is always kept in the desired position, ready for use at any minute. Slipped over the lifting-rod $g$ is a friction-plate, $h$, which is operated by the bifurcated end of the lever $c$. By working the lever up and down this plate is made to bite by frictional contact the side of the rod, so as to alternately raise the rod, and then descend by its own gravity for another hold. As soon as the upward motion of the rod ceases the dog catches the rod and prevents it from descending, while the friction-plate $h$ slides down to again take hold. Pivoted to the top of the standard is a swinging lever, $i$, which can be swung around so as to catch under the edge of the dog, and, by preventing it from falling forward on the rod, keeps it from catching hold.

While the dog is thus held, by letting the plate $h$ rest upon its top, the rod is released and falls at once back into the standard.

Having thus described my invention, what I claim as new, and desire to secure by Letters Patent, is—

1. The dog $e$ held in position by lifting-rod and slotted standard, substantially as set forth.

2. The pivoted lever $i$ for holding the dog from contact with the rod, substantially as shown.

3. The dog $e$ held as described, the lifting-plate $h$, rod $g$, and lever $c$, when arranged to operate as specified.

4. The standard $a$, lever $c$, slot $d$, dog $e$, rod $g$, lifting-plate $h$, and lever $i$, when all are combined to form a lifting-jack, substantially as shown and described.

In testimony that I claim the foregoing as my invention I hereunto affix my signature this 26th day of December, 1872.

JACOB H. HINTON.

Witnesses:
S. R. BONEWITZ,
J. H. CARR.